(12) United States Patent
Mukasa

(10) Patent No.: US 8,196,435 B2
(45) Date of Patent: Jun. 12, 2012

(54) HOLEY FIBER AND METHOD OF MANUFACTURING THE SAME

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 314 days.

(21) Appl. No.: 12/131,355

(22) Filed: Jun. 2, 2008

(65) Prior Publication Data

US 2008/0310806 A1 Dec. 18, 2008

(30) Foreign Application Priority Data

Jun. 14, 2007 (JP) ................. 2007-157696

(51) Int. Cl.
*C03B 37/07* (2006.01)
*C03B 37/025* (2006.01)

(52) U.S. Cl. ............... 65/382; 65/379; 65/381; 65/384; 65/409; 65/411

(58) Field of Classification Search .......... 65/379, 65/381, 384, 409, 411, 382
See application file for complete search history.

(56) References Cited

U.S. PATENT DOCUMENTS

| | | | | |
|---|---|---|---|---|
| 3,990,874 | A | * | 11/1976 | Schulman .................. 65/393 |
| 5,802,236 | A | * | 9/1998 | DiGiovanni et al. ......... 385/127 |
| 2001/0029756 | A1 | * | 10/2001 | Paek et al. ................. 65/395 |
| 2003/0230118 | A1 | * | 12/2003 | Dawes et al. ............... 65/379 |
| 2005/0238307 | A1 | * | 10/2005 | Hansen et al. .............. 385/125 |
| 2006/0034574 | A1 | | 2/2006 | Guan et al. |
| 2007/0204656 | A1 | * | 9/2007 | Gallagher et al. ........... 65/379 |

FOREIGN PATENT DOCUMENTS

| | | |
|---|---|---|
| JP | 2004-238246 | 8/2004 |
| JP | 2006-83003 | 3/2006 |
| WO | WO 2006/006604 A1 | 1/2006 |

OTHER PUBLICATIONS

Kenji Kurokawa et al.,"Penalty-free dispersion-managed soliton transmission over 100km low loss PCF", Proc. OFC PDP21, 2005, 3 pgs.
Jonathan C. Knight, "Photonic Crystal fibres", Nature vol. 424, Aug. 14, 2003, pp. 847-851.
U.S. Appl. No. 12/129,257, filed May 29, 2008, Mukasa, et al.
U.S. Appl. No. 12/170,822, filed Jul. 10, 2008, Mukasa.
U.S. Appl. No. 12/699,916, filed Feb. 4, 2010, Mukasa.
U.S. Appl. No. 12/720,469, filed Mar. 9, 2010, Mukasa.
Office Action issued on May 10, 2011 in the corresponding Japanese Patent Application No. 2007-157696 (with English Translation).
U.S. Appl. No. 12/875,167, filed Sep. 3, 2010, Sugizaki, et al.
U.S. Appl. No. 12/980,857, filed Dec. 29, 2010, Mukasa.
U.S. Appl. No. 12/938,104, filed Nov. 2, 2010, Takahashi, et al.

* cited by examiner

*Primary Examiner* — Matthew Daniels
*Assistant Examiner* — Erin Snelting
(74) *Attorney, Agent, or Firm* — Oblon, Spivak, McClelland, Maier & Neustadt, L.L.P.

(57) ABSTRACT

A method of manufacturing a holey fiber includes forming a preform and drawing the preform. The forming includes arranging a core rod at a center of a jacket tube and arranging capillary tubes having hollows around the core rod inside the jacket tube. The drawing includes heat melting the preform in a heating furnace while controlling at least one of a gas pressure to be applied to insides of the hollows of the capillary tubes, a temperature of the heating furnace, and a drawing speed, based on a structure of air holes to be formed in a first layer from the core region.

5 Claims, 14 Drawing Sheets

| | CONFINEMENT LOSS [dB/km] | CHROMATIC DISPERSION [ps/nm/km] | DISPERSION SLOPE [ps/nm²/km] | $A_{eff}$ [$\mu m^2$] | BENDING LOSS [dB/m(20 mm φ)] |
|---|---|---|---|---|---|
| CALCULATION EXAMPLE 1 | <0.001 | 28.0 | 0.0681 | 114.6 | 1.6 |

FIG.9

| | SYMBOL | CONFINEMENT LOSS [dB/km] | CHROMATIC DISPERSION [ps/nm/km] | DISPERSION SLOPE [ps/nm²/km] | $A_{eff}$ [$\mu m^2$] |
|---|---|---|---|---|---|
| CALCULATION EXAMPLE 1-1 | HF-0.30-10-12 | 0.007 | 27.3 | 0.0677 | 130.8 |
| CALCULATION EXAMPLE 1-2 | HF-0.35-10-12 | <0.001 | 27.5 | 0.0678 | 126.2 |
| CALCULATION EXAMPLE 1-3 | HF-0.40-10-12 | <0.001 | 27.7 | 0.0679 | 122.1 |
| CALCULATION EXAMPLE 1-4 | HF-0.45-10-12 | <0.001 | 27.8 | 0.0681 | 118.3 |
| CALCULATION EXAMPLE 1-5 | HF-0.55-10-12 | <0.001 | 28.2 | 0.0683 | 111.4 |
| CALCULATION EXAMPLE 1-6 | HF-0.60-10-12 | <0.001 | 28.4 | 0.0684 | 108.1 |
| CALCULATION EXAMPLE 1-7 | HF-0.65-10-12 | <0.001 | 28.7 | 0.0686 | 105.1 |
| CALCULATION EXAMPLE 1-8 | HF-0.70-10-12 | <0.001 | 28.9 | 0.0687 | 102.1 |

FIG.10

| | SYMBOL | CONFINEMENT LOSS [dB/km] | CHROMATIC DISPERSION [ps/nm/km] | DISPERSION SLOPE [ps/nm²/km] | Aeff [μm²] |
|---|---|---|---|---|---|
| CALCULATION EXAMPLE 1-9 | HF-0.30-10-14 | 0.007 | 26.8 | 0.0674 | 148.2 |
| CALCULATION EXAMPLE 1-10 | HF-0.35-10-14 | 0.003 | 27.1 | 0.0676 | 138.3 |
| CALCULATION EXAMPLE 1-11 | HF-0.40-10-14 | 0.001 | 27.4 | 0.0678 | 129.6 |
| CALCULATION EXAMPLE 1-12 | HF-0.45-10-14 | <0.001 | 27.7 | 0.0680 | 121.8 |
| CALCULATION EXAMPLE 1-13 | HF-0.55-10-14 | <0.001 | 28.4 | 0.0684 | 108.2 |
| CALCULATION EXAMPLE 1-14 | HF-0.60-10-14 | <0.001 | 28.7 | 0.0686 | 102.0 |
| CALCULATION EXAMPLE 1-15 | HF-0.65-10-14 | <0.001 | 29.1 | 0.0688 | 96.3 |
| CALCULATION EXAMPLE 1-16 | HF-0.70-10-14 | <0.001 | 29.6 | 0.0690 | 90.9 |

FIG.11

| SYMBOL | | CONFINEMENT LOSS [dB/km] | CHROMATIC DISPERSION [ps/nm/km] | DISPERSION SLOPE [ps/nm²/km] | Aeff [μm²] |
|---|---|---|---|---|---|
| CALCULATION EXAMPLE 1-17 | HF-0.30-0.30-10-124 | <0.001 | 26.1 | 0.0670 | 166.8 |
| CALCULATION EXAMPLE 1-18 | HF-0.30-0.40-10-124 | <0.001 | 26.7 | 0.0674 | 147.2 |
| CALCULATION EXAMPLE 1-19 | HF-0.30-0.60-10-124 | <0.001 | 28.0 | 0.0681 | 116.4 |
| CALCULATION EXAMPLE 1-20 | HF-0.30-0.70-10-124 | 0.015 | 28.9 | 0.0685 | 103.3 |
| CALCULATION EXAMPLE 1-21 | HF-0.40-0.30-10-124 | 0.015 | 26.4 | 0.0672 | 156.8 |
| CALCULATION EXAMPLE 1-22 | HF-0.40-0.40-10-124 | <0.001 | 27.0 | 0.0676 | 137.7 |
| CALCULATION EXAMPLE 1-23 | HF-0.40-0.60-10-124 | 0.005 | 28.4 | 0.0683 | 108.6 |
| CALCULATION EXAMPLE 1-24 | HF-0.40-0.70-10-124 | <0.001 | 29.2 | 0.0688 | 96.5 |
| CALCULATION EXAMPLE 1-25 | HF-0.60-0.30-10-124 | <0.001 | 27.2 | 0.0676 | 140.7 |
| CALCULATION EXAMPLE 1-26 | HF-0.60-0.40-10-124 | 0.015 | 27.8 | 0.0680 | 122.4 |
| CALCULATION EXAMPLE 1-27 | HF-0.60-0.60-10-124 | 0.005 | 29.2 | 0.0688 | 96.2 |
| CALCULATION EXAMPLE 1-28 | HF-0.60-0.70-10-124 | <0.001 | 30.0 | 0.0693 | 85.7 |
| CALCULATION EXAMPLE 1-29 | HF-0.70-0.30-10-124 | <0.001 | 27.6 | 0.0679 | 134.2 |
| CALCULATION EXAMPLE 1-30 | HF-0.70-0.40-10-124 | <0.001 | 28.2 | 0.0683 | 116.0 |
| CALCULATION EXAMPLE 1-31 | HF-0.70-0.60-10-124 | <0.001 | 26.7 | 0.0691 | 90.7 |
| CALCULATION EXAMPLE 1-32 | HF-0.70-0.70-10-124 | <0.001 | 30.5 | 0.06960 | 80.9 |

FIG.13

| | SYMBOL | CONFINEMENT LOSS [dB/km] | CHROMATIC DISPERSION [ps/nm/km] | DISPERSION SLOPE [ps/nm²/km] | Aeff [μm²] |
|---|---|---|---|---|---|
| CALCULATION EXAMPLE 2-1 | HF-0.30-10-21 | 0.007 | 28.0 | 0.0682 | 114.7 |
| CALCULATION EXAMPLE 2-2 | HF-0.40-10-21 | 0.003 | 28.0 | 0.0682 | 114.9 |
| CALCULATION EXAMPLE 2-3 | HF-0.60-10-21 | 0.001 | 28.0 | 0.0682 | 114.7 |
| CALCULATION EXAMPLE 2-4 | HF-0.70-10-21 | <0.001 | 28.0 | 0.0682 | 114.7 |
| CALCULATION EXAMPLE 2-5 | HF-0.30-10-22 | <0.001 | 28.0 | 0.0682 | 115.1 |
| CALCULATION EXAMPLE 2-6 | HF-0.40-10-22 | <0.001 | 28.0 | 0.0682 | 114.9 |
| CALCULATION EXAMPLE 2-7 | HF-0.60-10-22 | <0.001 | 28.0 | 0.0682 | 114.6 |
| CALCULATION EXAMPLE 2-8 | HF-0.70-10-22 | <0.001 | 28.0 | 0.0682 | 114.4 |
| CALCULATION EXAMPLE 2-9 | HF-0.30-10-23 | <0.001 | 28.0 | 0.0682 | 114.8 |
| CALCULATION EXAMPLE 2-10 | HF-0.40-10-23 | <0.001 | 28.0 | 0.0682 | 114.7 |
| CALCULATION EXAMPLE 2-11 | HF-0.60-10-23 | <0.001 | 28.0 | 0.0682 | 114.7 |
| CALCULATION EXAMPLE 2-12 | HF-0.70-10-23 | <0.001 | 28.0 | 0.0682 | 114.7 |
| CALCULATION EXAMPLE 2-13 | HF-0.30-10-24 | <0.001 | 28.0 | 0.0682 | 114.9 |
| CALCULATION EXAMPLE 2-14 | HF-0.40-10-24 | <0.001 | 28.0 | 0.0682 | 114.8 |
| CALCULATION EXAMPLE 2-15 | HF-0.60-10-24 | <0.001 | 28.0 | 0.0682 | 114.7 |
| CALCULATION EXAMPLE 2-16 | HF-0.70-10-24 | <0.001 | 28.0 | 0.0682 | 114.6 |

FIG.14

| | SYMBOL | CONFINEMENT LOSS [dB/km] | CHROMATIC DISPERSION [ps/nm/km] | DISPERSION SLOPE [ps/nm²/km] | Aeff [μm²] |
|---|---|---|---|---|---|
| CALCULATION EXAMPLE 2-17 | HF-0.30-10-212 | 0.007 | 28.0 | 0.0682 | 115.2 |
| CALCULATION EXAMPLE 2-18 | HF-0.40-10-212 | 0.003 | 28.0 | 0.0682 | 114.9 |
| CALCULATION EXAMPLE 2-19 | HF-0.60-10-212 | 0.001 | 28.0 | 0.0682 | 114.6 |
| CALCULATION EXAMPLE 2-20 | HF-0.70-10-212 | <0.001 | 28.0 | 0.0682 | 114.4 |
| CALCULATION EXAMPLE 2-21 | HF-0.30-10-234 | <0.001 | 28.0 | 0.0682 | 114.9 |
| CALCULATION EXAMPLE 2-22 | HF-0.40-10-234 | <0.001 | 28.0 | 0.0682 | 114.8 |
| CALCULATION EXAMPLE 2-23 | HF-0.60-10-234 | <0.001 | 28.0 | 0.0682 | 114.7 |
| CALCULATION EXAMPLE 2-24 | HF-0.70-10-234 | <0.001 | 28.0 | 0.0682 | 114.6 |
| CALCULATION EXAMPLE 2-25 | HF-0.30-10-2123 | <0.001 | 28.0 | 0.0682 | 115.2 |
| CALCULATION EXAMPLE 2-26 | HF-0.40-10-2123 | <0.001 | 28.0 | 0.0682 | 114.9 |
| CALCULATION EXAMPLE 2-27 | HF-0.60-10-2123 | <0.001 | 28.0 | 0.0682 | 114.6 |
| CALCULATION EXAMPLE 2-28 | HF-0.70-10-2123 | <0.001 | 28.0 | 0.0682 | 114.4 |
| CALCULATION EXAMPLE 2-29 | HF-0.30-10-2234 | <0.001 | 28.0 | 0.0682 | 115.4 |
| CALCULATION EXAMPLE 2-30 | HF-0.40-10-2234 | <0.001 | 28.0 | 0.0682 | 115.0 |
| CALCULATION EXAMPLE 2-31 | HF-0.60-10-2234 | <0.001 | 28.0 | 0.0682 | 114.5 |
| CALCULATION EXAMPLE 2-32 | HF-0.70-10-2234 | <0.001 | 28.0 | 0.0682 | 114.3 |
| CALCULATION EXAMPLE 2-33 | HF-0.30-10-21234 | <0.001 | 28.0 | 0.0682 | 115.4 |
| CALCULATION EXAMPLE 2-34 | HF-0.40-10-21234 | <0.001 | 28.0 | 0.0682 | 115.0 |
| CALCULATION EXAMPLE 2-35 | HF-0.60-10-21234 | <0.001 | 28.0 | 0.0682 | 114.5 |
| CALCULATION EXAMPLE 2-36 | HF-0.70-10-21234 | <0.001 | 28.0 | 0.0682 | 114.3 |

CALCULATION EXAMPLE 1     CALCULATION EXAMPLE 1-1     CALCULATION EXAMPLE 1-9     CALCULATION EXAMPLE 1-17

CALCULATION EXAMPLE 1-20     CALCULATION EXAMPLE 1-29     CALCULATION EXAMPLE 2-33     CALCULATION EXAMPLE 2-36

FIG.17

| CONFINEMENT LOSS [dB/km] | CHROMATIC DISPERSION [ps/nm/km] | DISPERSION SLOPE [ps/nm²/km] | Aeff [$\mu m^2$] | BENDING LOSS [dB/m(20 mm $\phi$)] |
|---|---|---|---|---|
| <0.001 | 28.2 | 0.0679 | 115.1 | 1.9 |

HOLEY FIBER AND METHOD OF MANUFACTURING THE SAME

BACKGROUND OF THE INVENTION

1. Field of the Invention

The present invention relates to a holey fiber and a method of manufacturing the same.

2. Description of the Related Art

A holey fiber is an optical fiber having air holes arranged in a periodic manner in a cladding region. The cladding region surrounds a core region. The cladding region has reduced average refractive index because of the presence of the air holes so that a light passes almost entirely through the core region because of the total reflection of the light.

Because the refractive index of holey fibers can be controlled by controlling various parameters of the air holes, the holey fibers can realize unique properties that can not be realized in the other optical fibers such as endlessly single mode (ESM) and anomalous dispersion at a short wavelength. The ESM means that a cut-off wavelength is not present and a light is transmitted in a single mode at all wavelengths. With the ESM, it is possible to realize an optical transmission at a high transmission speed over a broadband. For example, a result of an experiment of a dispersion-managed soliton transmission at a transmission speed of 10 Gb/s by forming an optical path of 100 kilometers by combining the holey fiber and a dispersion compensating optical fiber is disclosed in K. Kurokawa, et al., "Penalty-Free Dispersion-Managed Soliton Transmission over 100 km Low Loss PCF", Proc. OFC PDP21 (2005).

Holey fibers are manufactured by drawing a preform. The preform is made of silica glass and holes are formed in the preform by stack-and-draw method, drill method, or sol-gel method. Shapes of the air holes can disadvantageously deform during the drawing process. A technology for preventing deformation of shapes of air holes during the drawing process is disclosed in, for example, Japanese Patent Application Laid-open No. 2006-83003 and Jonathan C. Knight, "Photonics crystal fibers", NATURE Aug. 14, 2003, Vol. 424, pp. 847-851. Specifically, the preform is drawn while precisely controlling the pressure of inert gas.

In holey fibers, the cladding region has reduced average refractive index because of the presence of the air holes so that a light is almost entirely confined in the core region. Generally, upon forming the air holes around the core region in layers, three or more layers are necessary. Furthermore, upon arranging the air holes in triangular lattices in such layers, a large number of the air holes are necessary. Specifically, the number of air holes increases as the number of layers increases. For example, as much as 36 air holes are necessary in a three-layer structure, 60 in a four-layer structure, and 90 in a five-layer structure. The characteristics of the holey fiber depend on the number of the layers, inner diameters of the air holes, and air hole pitches of the air holes.

However, if inner diameters and air hole pitches of all the air holes are to be controlled precisely for manufacturing the holey fiber with desired characteristics, operational load and processing time increase. This reduces the productivity.

SUMMARY OF THE INVENTION

It is an object of the present invention to at least partially solve the problems in the conventional technology.

According to an aspect of the present invention, there is provided a method of manufacturing a holey fiber including a core region and a cladding region surrounding the core region and having air holes arranged around the core region in layers. The method includes forming a preform by arranging a core rod at a center of a jacket tube and arranging capillary tubes having hollows around the core rod inside the jacket tube; and drawing the preform by heat melting the preform in a heating furnace while controlling at least one of a gas pressure to be applied to insides of the hollows of the capillary tubes, a temperature of the heating furnace, and a drawing speed, based on a structure of air holes to be formed in a first layer from the core region.

According to an aspect of the present invention, there is provided a method of manufacturing a holey fiber including a core region and a cladding region surrounding the core region and having air holes arranged around the core region in layers. The method includes forming a preform by arranging a core rod at a center of a jacket tube and arranging capillary tubes having hollows around the core rod inside the jacket tube; and drawing the preform by heat melting the preform in a heating furnace. The drawing includes preparing capillary tubes; measuring errors of inner diameters of the capillary tubes from an inner diameter reference value and measuring errors of outer diameters of the capillary tubes from an outer diameter reference value; selecting a predetermined number of the capillary tubes having errors smaller than a threshold based on the errors measured at the measuring; and arranging the capillary tubes selected at the selecting in a first layer from the core rod.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 9 to 11 are tables containing data of characteristics of holey fibers at a wavelength of 1550 nanometers according to Calculation Examples 1-1 to 1-32;

FIGS. 13 and 14 are tables containing data of characteristics of holey fibers at a wavelength of 1550 nanometers according to Calculation Examples 2-1 to 2-36;

FIG. 17 is a table containing data of characteristics of the holey fiber shown in FIG. 16.

DETAILED DESCRIPTION OF THE PREFERRED EMBODIMENTS

Exemplary embodiments of the present invention are explained in detail below with reference to the accompanying drawings. The present invention is not limited to the following embodiments. In the embodiments, bending loss is calculated under such a condition that an optical fiber is wound 16 times at a bending diameter of 20 millimeters. Furthermore, terms and methods are based on definitions and test methods defined by International Telecommunication Union Telecommunication Standardization Sector (ITU-T) G.650.1 unless otherwise specified in this document.

A holey fiber manufacturing method according to a first embodiment of the present invention and details of a holey fiber 10 are described below. The holey fiber 10 is manufactured by the stack and draw method.

Figure 1:
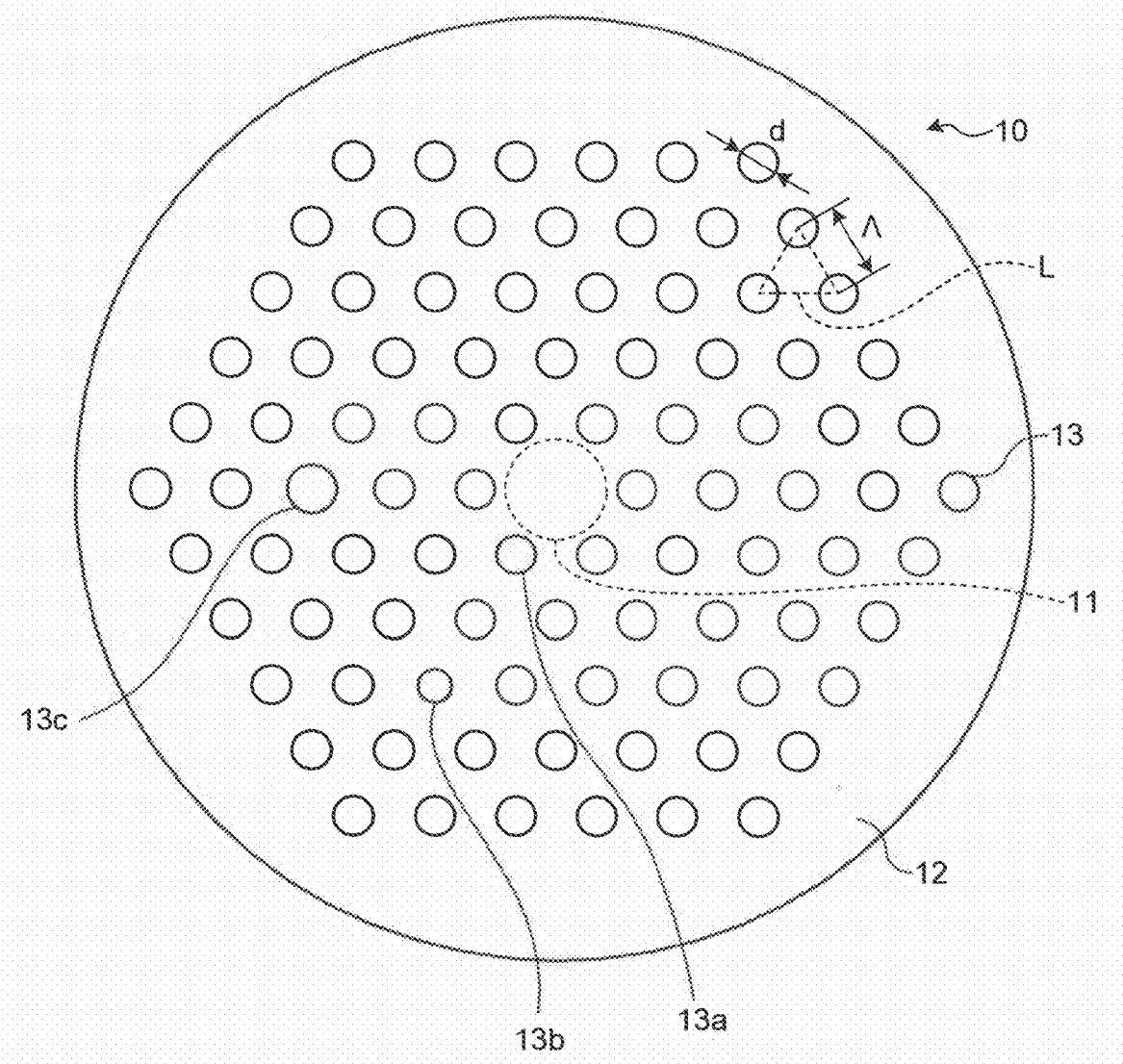
FIG. 1 is a schematic diagram of a holey fiber manufactured by a method according to a first embodiment of the present invention.

FIG. 1 is a schematic diagram of the holey fiber 10. The holey fiber 10 includes a core region 11 at a center of the holey fiber 10 and a cladding region 12 surrounding the core region 11. The cladding region 12 contains air holes 13. The core region 11 and the cladding region 12 are made of silica glass and the like.

The cladding region 12 contains five layers of the air holes 13 in a triangular lattice L. If a diameter of the air holes 13 is represented by "d" and a lattice constant of the triangular lattice L, that is, a pitch between centers of the air holes 13, is represented by "$\Lambda$", the characteristics of the holey fiber can be controlled by adjusting values of $\Lambda$ and d/$\Lambda$ as appropriate.

Inner diameters and positions of the air holes 13 can vary because of variations in a manufacturing process. For example, some of the air hole, such as an air hole 13b, can have a relatively small diameter, and some of the air hole, such as an air hole 13c, can have a relatively large diameter. However, the holey fiber 10 is formed so that a value of d/$\Lambda$ of at least air holes 13a on a first layer from the core region 11 is within a predetermined allowable error range from a designed value. That is, the value d/$\Lambda$ of each of the air holes 13a on the first layer is highly precisely controlled because characteristics of the holey fiber 10 depends on the value d/$\Lambda$. Therefore, even if the air holes 13 vary in sizes and positions, the holey fiber 10 can realize desired characteristics.

Figure 2:
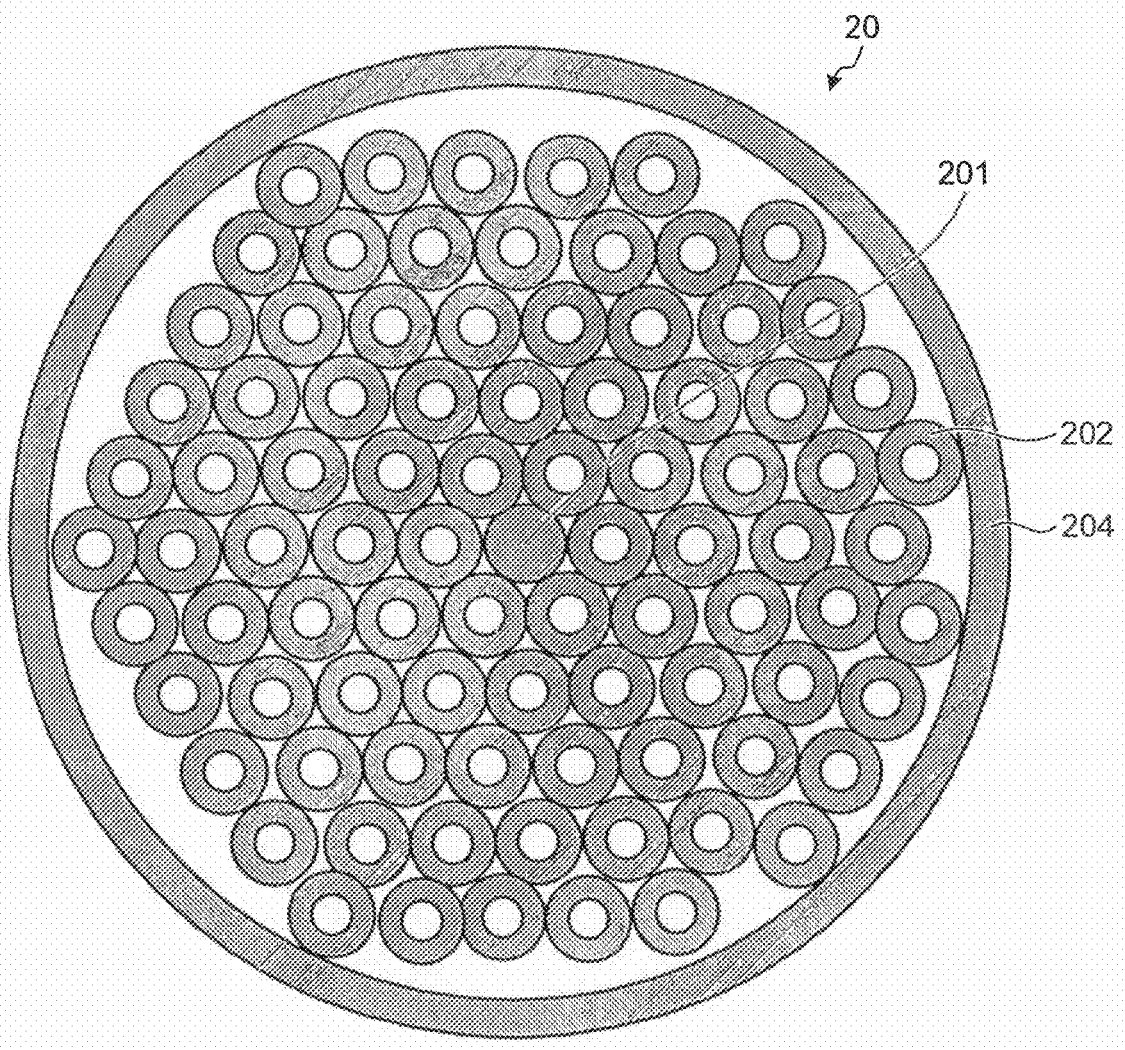
FIG. 2 is a schematic diagram of a preform for manufacturing the holey fiber shown in FIG. 1.

The method of manufacturing the holey fiber 10 is described with reference to FIGS. 2 and 3. A preform 20 for manufacturing the holey fiber 10 is formed in the manner explained below. FIG. 2 is a schematic diagram of the preform 20. A core rod 201 as a solid core made of silica glass for forming the core region 11 and capillary tubes 202 having hollows at the center and made of silica glass for forming the air holes 13 are prepared. The capillary tubes 202 are arranged around the core rod 201. The capillary tubes 202 and the core rod 201 are bundled and accommodated in a hollow of a jacket tube 204 made of silica glass. Diameters, inner diameters, and outer diameters of the core rod 201, the capillary tubes 202, and the jacket tube 204, and the number of the capillary tubes 202 are determined depending on inner diameters of the air holes, air hole pitch, and number of layers.

Figure 3:
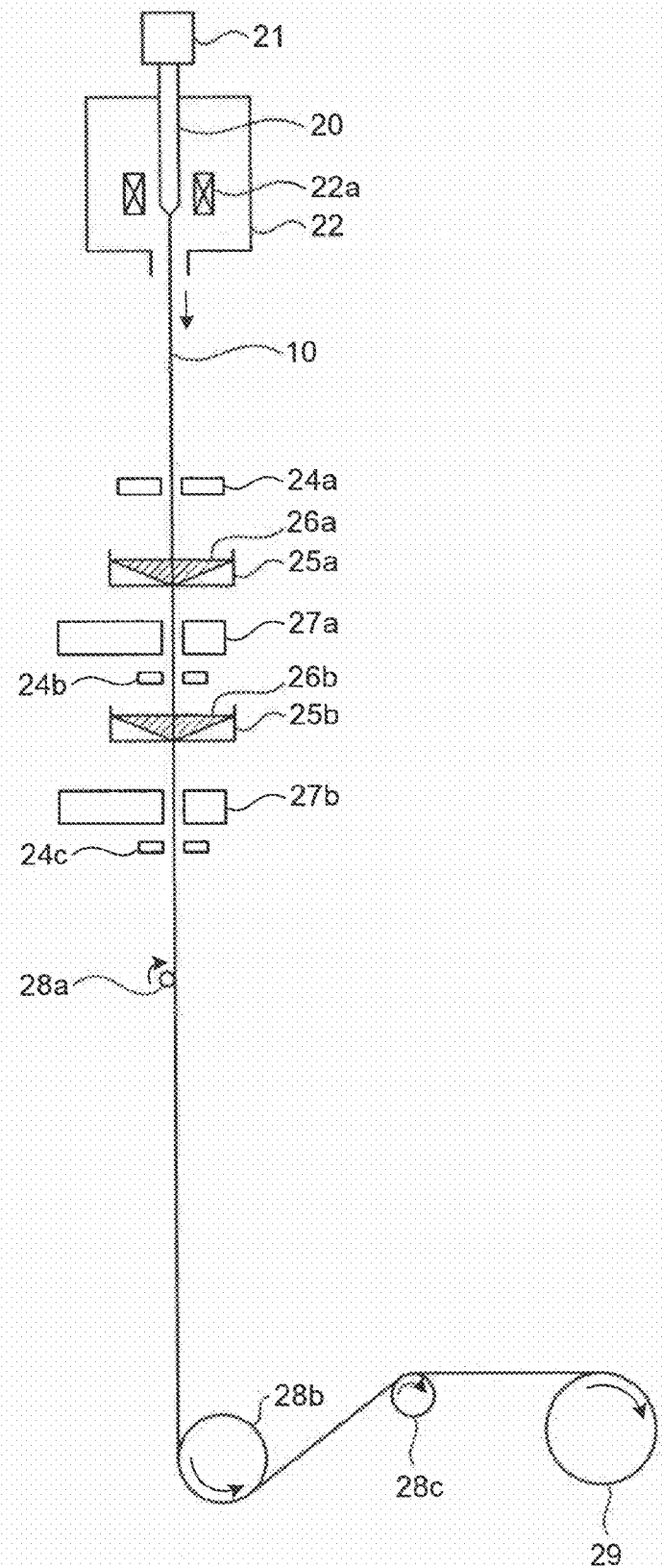
FIG. 3 is a schematic diagram for explaining a method of manufacturing the holey fiber shown in FIG. 1.

A bottom end of the preform 20 is heat melted to collapse bottom portions of holes of the capillary tubes 202 and the preform 20 is set to a draw tower 22 shown in FIG. 3. A gas pressure device 21 is connected to an unmelted upper end of the preform 20.

The distal end of the preform 20 is heat melted by a heater 22a to draw the holey fiber 10. During the drawing process, the gas pressure device 21 applies pressure to insides of the holes of the capillary tubes 202 to maintain shapes of air holes. At this state, a control value of gas pressure to be applied is determined based on a structure of air holes to be formed by the capillary tubes 202 on a first layer from the core rod 201. Examples of the structure of the air holes include positions of air holes and an average of inner diameters of the air holes. Then, the gas pressure is controlled during the drawing process so that the average of the inner diameters of the air holes on the first layer reaches a designed value. Thus, the inner diameters of the air holes 13a on the first layer in the holey fiber 10 are more precisely controlled compared to the inner diameters of the air holes 13 on other layers. As a result, the value of d/$\Lambda$ of each of the air holes 13a can be within the predetermined allowable error range, realizing desired characteristics of the holey fiber 10.

As described above, according to the first embodiment, the gas pressure is controlled based on the structure of the air holes on the first layer and the structures of the air holes on other layers are not considered. Therefore, operational load and processing time in the manufacturing process can be largely reduced. As a result, the holey fiber 10 with desired characteristics can be manufactured speedily.

Furthermore, the gas pressure can be controlled to optimal gas pressure by changing a control value depending on a length of the holey fiber 10 and performing a feedback control in accordance with a cross section of the holey fiber 10 during the drawing process.

In the first embodiment, the gas pressure is controlled to control the structure of the air holes. However, the structure of the air holes can be controlled by other methods such as by completely sealing the holes of the capillary tubes 202 in the preform 20 and controlling a heating temperature and a drawing speed. A method of controlling the structure of the air holes by controlling the heating temperature and the drawing speed is described in detail below.

When the holes of the capillary tubes 202 are in completely sealed state, the shapes of the holes are maintained by internal natural pressure. In this state, by raising the heating temperature of the preform 20, a viscosity of glass decreases, which leads to shrinking of the holes. Therefore, it is possible to reduce diameters of the holes by employing this method. On the other hand, when the drawing speed is reduced, the preform 20 is subjected to be in a hot region for a relatively long time. Thus, it is possible to achieve the same effect as that attained by raising a heating temperature.

From a point of controlling the characteristics of the holey fiber 10, it is preferable to determine a target value of the above processes so that the inner diameters of the air holes of the holey fiber 10 match the desired value in the end of the processes.

As shown in FIG. 3, an outer-diameter measuring device 24a measures an outer diameter of the drawn holey fiber 10, a resin applying device 25a applies ultraviolet curable resin 26a as an inner coating layer on an outer periphery of the holey fiber 10, an ultraviolet applying device 27a causes the ultraviolet curable resin 26a to be cured with ultraviolet rays, and an outer-diameter measuring device 24b measures an outer diameter of the inner coating layer. Similarly, a resin applying device 25b applies ultraviolet curable resin 26b as an outer coating layer on an outer periphery of the inner coating layer, an ultraviolet applying device 27b causes the ultraviolet curable resin 26b to be cured with ultraviolet rays, and an outer-diameter measuring device 24c measures an outer diameter of the outer coating layer. The holey fiber 10 coated with layers formed in the above manner is guided by guide rollers 28a to 28c, and wound up by a take-up spool 29.

As described above, according to the first embodiment, operational load and processing time in a manufacturing process can be largely reduced. As a result, it is possible to manufacture the holey fiber with desired characteristics with high productivity.

A holey fiber manufacturing method according to a second embodiment of the present invention is described below. In the method according to the second embodiment, a preform is drawn in the similar manner as the first embodiment. However, a method of forming the preform is different from that of the first embodiment. Specifically, errors of inner diameters of capillary tubes from an inner-diameter reference value and errors of outer diameters of capillary tubes from an outer-diameter reference value are measured, capillary tubes of which errors are smaller than those of other capillary tubes are selected, and selected capillary tubes are arranged on a first layer from a core rod.

Figure 4:
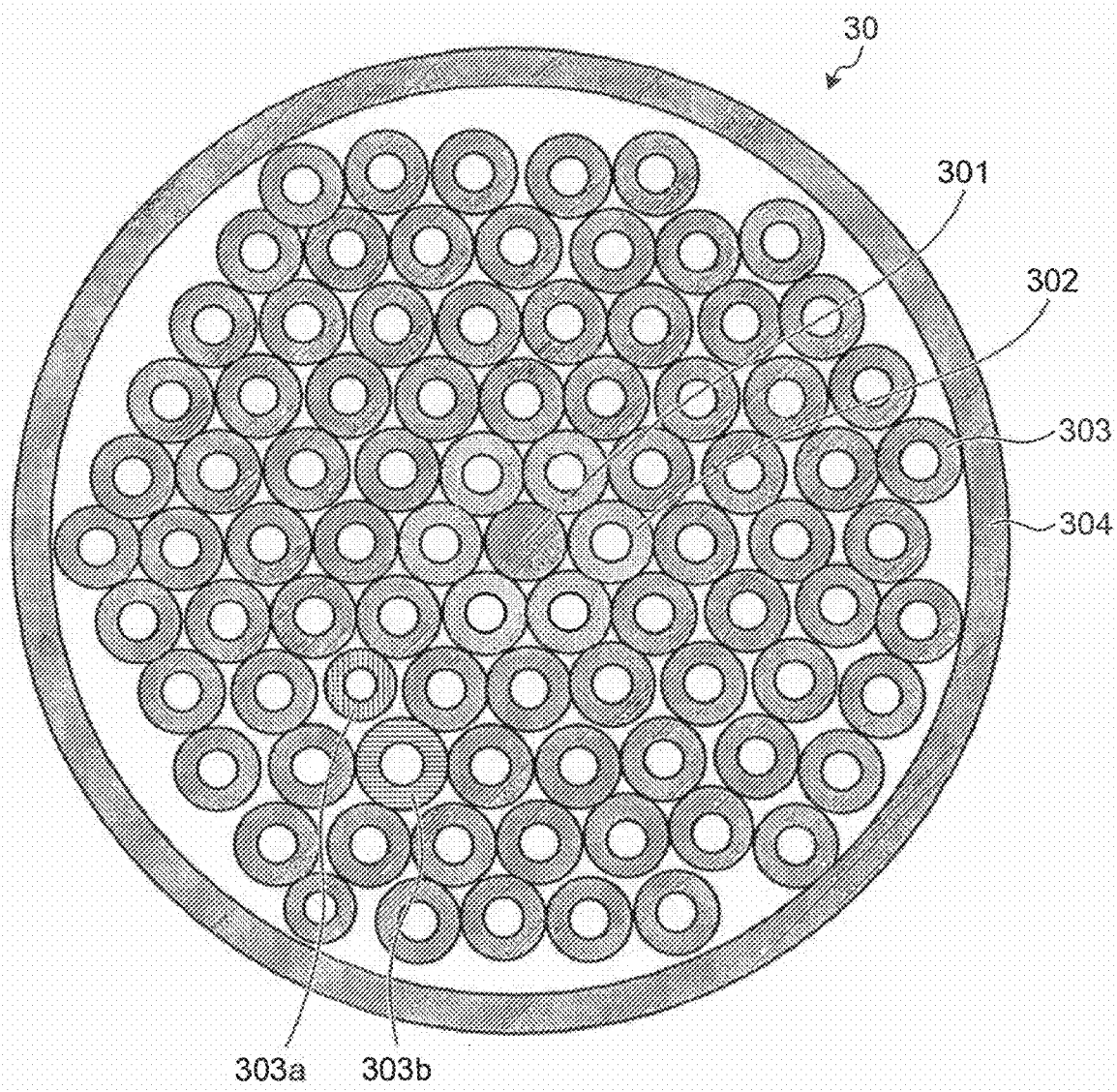
FIG. 4 is a schematic diagram of a preform used in a method of manufacturing a holey fiber according to a second embodiment of the present invention.

FIG. 4 is a schematic diagram of a preform 30 used in the method according to the second embodiment. The preform 30 is formed in the manner explained below. A core rod 301 and capillary tubes 302 and 303 manufactured by a pull method and a draw method are prepared. At this process, inner diameters and outer diameters of the capillary tubes 302 and 303 can vary because of variations in a manufacturing process. Therefore, errors of the inner diameters of the capillary tubes 302 and 303 from an inner-diameter reference value and errors of the outer diameters of the capillary tubes 302 and 303 from an outer-diameter reference value are measured, and the capillary tubes 302 of which errors are smaller than those of the capillary tubes 303 are selected. Specifically, the capillary tubes 302 of which errors are smaller than the average of the errors of all the capillary tubes are selected.

More preferably, assuming that the number of the capillary tubes to be arranged on the first layer is "n", then "n" number of the capillary tubes 302 are selected in order of a smallest value of the errors. Then, the selected capillary tubes 302 are arranged on the first layer from the core rod 301. The capillary tubes 303 are arranged around the capillary tubes 302. At this state, the errors of the inner diameters and the outer diameters of the capillary tubes 302 from the reference values are preferably within plus or minus 20% of the reference values, respectively. By setting the errors within the above range, it is possible to easily set a value of ratio between the inner diameter of each of the air holes on the first layer and an air hole pitch between the air holes to be within plus or minus 20% of a target value. This bundle including both the core rod 301 and the capillary tubes 302 and 303 around the core rod 301 is accommodated in a hollow jacket tube 304 made of silica glass to form the preform 30.

Some of the capillary tubes 303, such as a capillary tube 303b, can have a relatively large inner diameter and a relatively large outer diameter while some of the capillary tubes 303, such as a capillary tube 303a, can have a relatively small inner diameter and a relatively small outer diameter in the preform 30. At this state, at least the capillary tubes 302 on the first layer from the core rod 301 have the inner diameter with a small error from an inner-diameter reference value and the outer diameter with a small error from an outer-diameter reference value, and variations in size are less. Therefore, by using the preform 30, it is possible to reduce variations of the values of d/Λ of each of the air holes on the first layer from a designed value. Thus, it is possible to manufacture the holey fiber with desired characteristics precisely and with high productivity.

The first and the second embodiments were examined by below simulations.

Figures 5, 6:
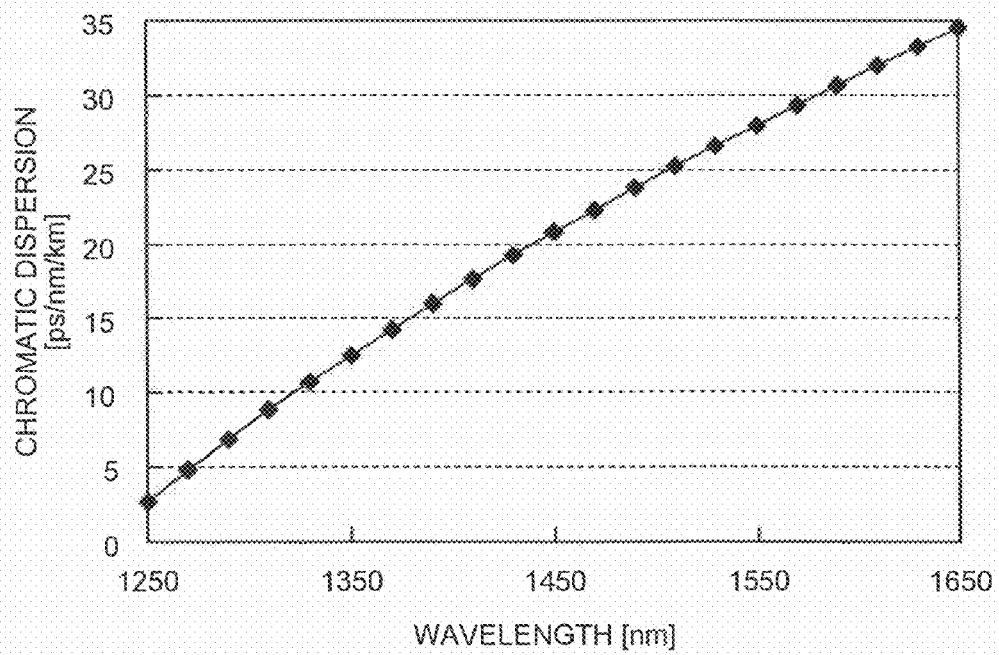
FIG. 5 is a table containing data of characteristics of a holey fiber at a wavelength of 1550 nanometers according to Calculation Example 1 of the present invention.
FIG. 6 is a graph of chromatic dispersion characteristics of the holey fiber shown in FIG. 5.
Figure 7:
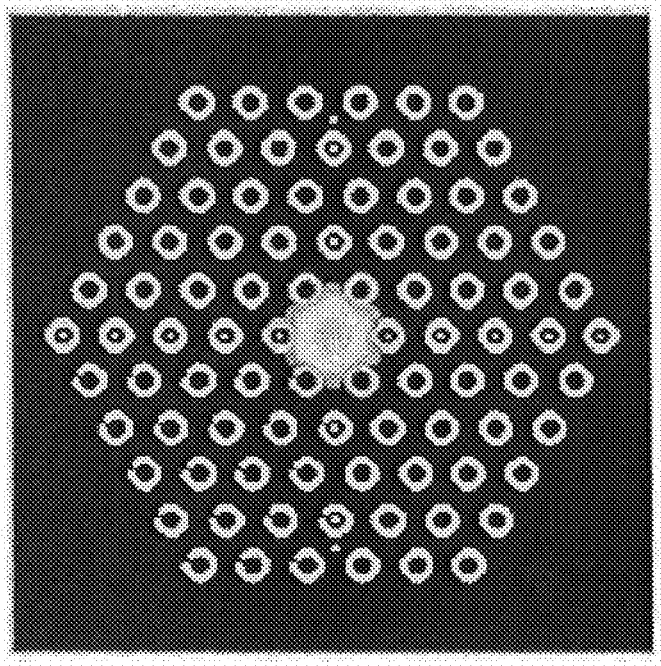
FIG. 7 is a schematic diagram of an optical field distribution (electric filed x-component (Ex) distribution) in the holey fiber shown in FIG. 5.

As Calculation Example 1, similar to the holey fiber 10, characteristics of a holey fiber made of silica glass and containing 90 holes arranged in triangular lattices in five layers were calculated by Finite Element Method (FEM) simulation. In Calculation Example 1, d/Λ was set to 0.50 and Λ was set to 10 micrometers where "d" was the inner diameter of each of the air holes and "Λ" was an air hole pitch between the air holes to realize the endlessly single mode (ESM) characteristics. FIG. 5 is a table containing data of characteristics of the holey fiber of Calculation Example 1 at a wavelength of 1550 nanometers. Aeff in FIG. 5 means an effective valid core area. As shown in FIG. 5, the holey fiber had a relatively low chromatic dispersion value of 28 ps/nm/km, a large effective core area of 115 square micrometers, and sufficiently small bending loss. Thus, the holey fiber can be suitably used as an optical fiber that can serve as a transmission path. FIG. 6 is a graph of chromatic dispersion characteristics of the holey fiber of Calculation Example 1. The holey fiber has chromatic dispersion characteristics of 3 ps/nm/km or more at wavelengths longer than 1250 nanometers. Thus, it can be seen from FIG. 5 that four-wave mixing that frequently occurs at a zero-dispersion wavelength can be suppressed in a wide band. FIG. 7 is a schematic diagram of an optical field distribution (electric filed x-component (Ex) distribution) in the holey fiber of Calculation Example 1. The field distribution corresponds to a Gaussian field distribution with the core region as a center point.

Figure 8:
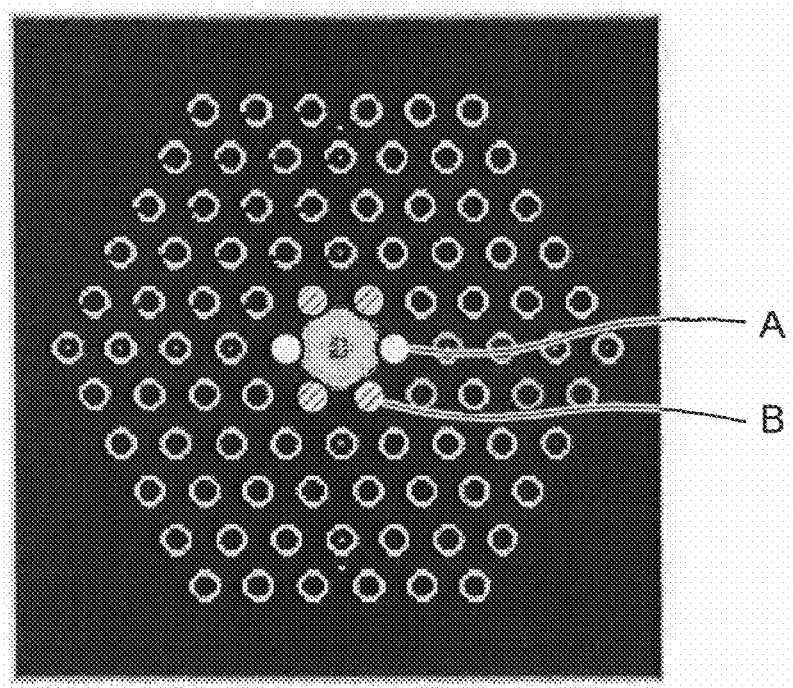
FIG. 8 is a schematic diagram for explaining positions of air holes whose inner diameters are varied in Calculation Examples 1-1 to 1-32 of the present invention.

As Calculation Examples 1-1 to 1-32, characteristics of holey fibers were calculated and their results are described below. In Calculation Examples 1-1 to 1-32, the values of Λ were the same as that of Calculation Example 1, however, the inner diameter of each of the air holes on the first layer, that is d/Λ, was changed in each Calculation Example. FIG. 8 is a schematic diagram for explaining positions of the air holes whose inner diameters were varied in Calculation Examples 1-1 to 1-32. Specifically, in Calculation Examples 1-1 to 1-8, inner diameters of two air holes A opposite to each other across the core region were uniformly changed. In Calculation Examples 1-9 to 1-16, inner diameters of four air holes B opposite to one another across the core region were uniformly changed. In Calculation Examples 1-17 to 1-32, the inner diameters of all the air holes A and B were uniformly changed.

FIGS. 9 to 11 are tables containing data of characteristics of the holey fibers at a wavelength of 1550 nanometers according to Calculation Examples 1-1 to 1-32. In FIGS. 9 to 11, "symbol" indicates variations of the air holes for each Calculation Example. Specifically, a symbol "HF-0.30-10-12" for Calculation Example 1-1 indicates that d/Λ was 0.30 and Λ was 10 micrometers for the two air holes A on the first layer (corresponding to 12). Similarly, a symbol "HF-0.30-10-14" for Calculation Example 1-9 indicates that d/Λ was 0.30 and Λ was 10 micrometers for the four air holes B on the first layer (corresponding to 14). Moreover, a symbol "HF-0.30-0.40-10-124" for Calculation Example 1-18 indicates that d/Λ was 0.30 and Λ was 10 micrometers for the two air holes A on the first layer while d/Λ was 0.40 and Λ was 10 micrometers for the four air holes B on the first layer.

As can be seen from FIGS. 9 to 11, when the inner diameters of the air holes on the first layer were changed, the characteristics of the holey fibers changed. Specifically, the Aeff changed the most. If the values of d/Λ are within a margin of error of plus or minus 0.1 from the designed value of 0.50, that is, errors are within plus or minus 20% of the designed value, changes in the Aeff are also to be within plus or minus 20% of the designed value. Such errors can be easily controlled in a manufacturing process.

Figure 12:
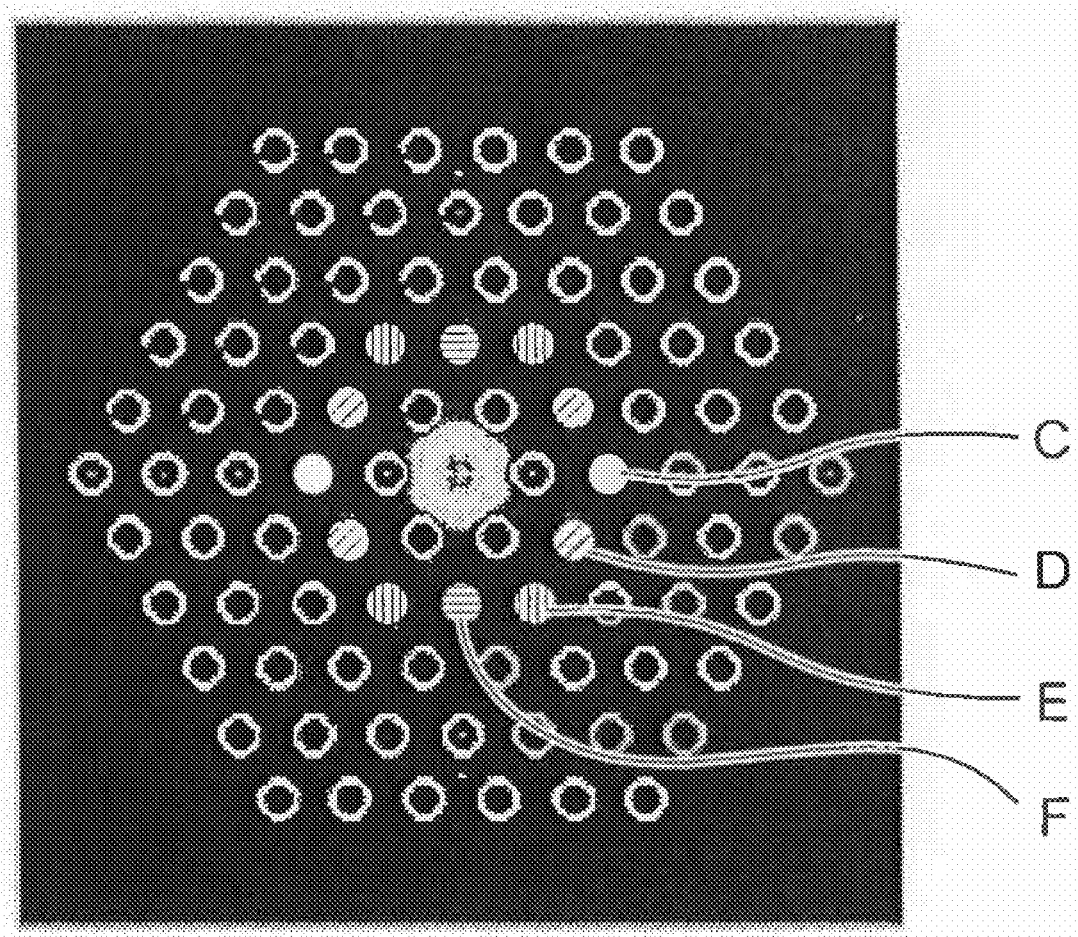
FIG. 12 is a schematic diagram for explaining positions of air holes whose inner diameters are varied in Calculation Examples 2-1 to 2-36 of the present invention.

As Calculation Examples 2-1 to 2-36, characteristics of holey fibers were calculated and their results are described below. In Calculation Examples 2-1 to 2-36, the values of $\Lambda$ were the same as that of Calculation Example 1, however, the inner diameter of each of the air holes on a second layer, that is $d/\Lambda$, was changed in each Calculation Example. FIG. 12 is a schematic diagram for explaining positions of the air holes whose inner diameters were varied in Calculation Examples 2-1 to 2-36. Specifically, in Calculation Examples 2-1 to 2-4, inner diameters of two air holes C opposite to each other across the core region were uniformly changed. In Calculation Examples 2-5 to 2-8, inner diameters of four air holes D opposite to one another across the core region were uniformly changed. In Calculation Examples 2-9 to 2-12, inner diameters of four air holes E opposite to one another across the core region were uniformly changed. In Calculation Examples 2-13 to 2-16, inner diameters of two air holes F opposite to each other across the core region were uniformly changed. In Calculation Examples 2-17 to 2-24, inner diameters of two types of air holes from among the air holes C to F were uniformly changed. In Calculation Examples 2-25 to 2-32, inner diameters of three types of the air holes from among the air holes C to F were uniformly changed. In Calculation Examples 2-33 to 2-36, the inner diameters of all the air holes C to F were uniformly changed.

FIGS. 13 and 14 are tables containing data of characteristics of the holey fibers at a wavelength of 1550 nanometers according to Calculation Examples 2-1 to 2-36. In FIGS. 13 and 14, "symbol" indicates variations of the air holes in each Calculation Example. Specifically, a symbol "HF-0.30-10-21" for Calculation Example 2-1 indicates that $d/\Lambda$ was 0.30 and $\Lambda$ was 10 micrometers for the two air holes C on the second layer (corresponding to 21). Similarly, a symbol "HF-0.30-10-22" for Calculation Example 2-6 indicates that $d/\Lambda$ was 0.30 and $\Lambda$ was 10 micrometers for the four air holes D on the second layer (corresponding to 22). A symbol "HF-0.30-10-23" for Calculation Example 2-9 indicates that $d/\Lambda$ was 0.30 and $\Lambda$ was 10 micrometers for the four air holes E on the second layer (corresponding to 23). A symbol "HF-0.30-10-24" for Calculation Example 2-9 indicates that $d/\Lambda$ was 0.30 and $\Lambda$ was 10 micrometers for the two air holes F on the second layer (corresponding to 24). A symbol "HF-0.30-10-212" for Calculation Example 2-17 indicates that $d/\Lambda$ was 0.30 and $\Lambda$ was 10 micrometers for the air holes C and D on the second layer (corresponding to 212). A symbol "HF-0.30-10-2123" for Calculation Example 2-25 indicates that $d/\Lambda$ was 0.30 and $\Lambda$ was 10 micrometers for the air holes C to E on the second layer (corresponding to 212).

As shown in FIGS. 13 and 14, the characteristics remain almost unchanged from those of the holey fiber of Calculation Example 1 even the inner diameters of the air holes on the second layer were changed. For example, as with Calculation Example 2-36, even when $d/\Lambda$ of all the air holes on the second layer were largely changed to 0.70 from the designed value of 0.50, the characteristics hardly changed from those of the holey fiber of Calculation Example 1. Similarly, inner diameters of air holes on a third layer and a fourth layer from the core region were changed as an examination; however characteristics of such holey fibers hardly changed from those of the holey fiber of Calculation Example 1.

Figure 15:
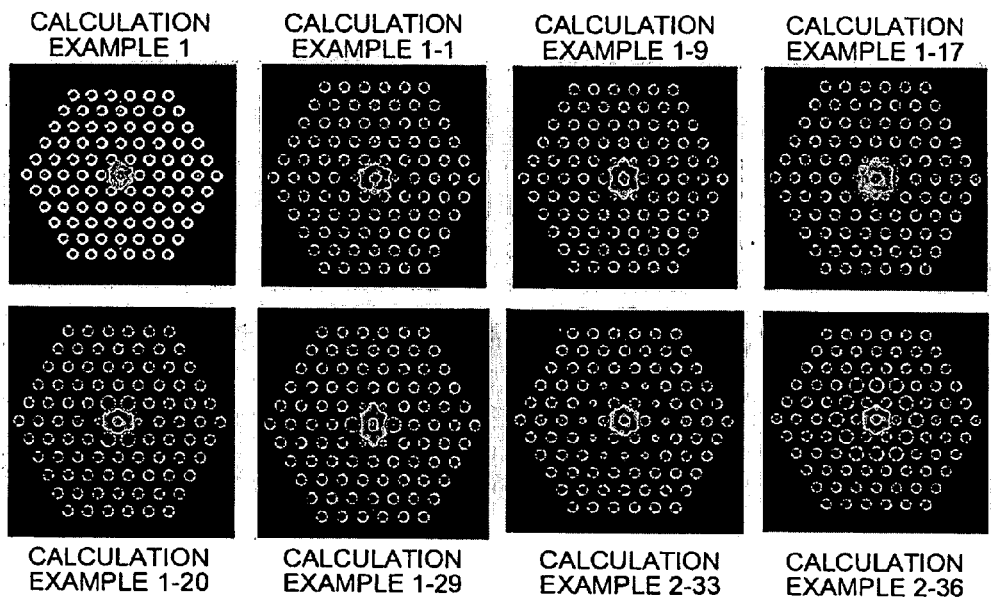
FIG. 15 is a schematic diagram for explaining optical field distributions (electric filed x-component (Ex) distribution) in the holey fibers of some of Calculation Examples.

FIG. 15 is a schematic diagram for explaining optical field distributions (electric filed x-component (Ex) distribution) in the holey fibers of Calculation Examples 1, 1-1, 1-9, 1-17, 1-20, 1-29, 2-33, and 2-36. The holey fibers of Calculation Examples 1-1, 1-9, 1-17, 1-20, and 1-29, in which the air holes on the first layer are changed, have field distribution largely different from that of the holey fiber of Calculation Example 1. On the other hand, the holey fibers of Calculation Examples 2-33 and 2-36, in which the air holes on the second layer are changed, have field distribution almost the same as that of the holey fiber of Calculation Example 1.

Thus, by precisely controlling the air holes on the first layer of the holey fiber, it is possible to attain desired characteristics even when the air holes on the layers other than the first layer vary in their structures.

An examination result of a holey fiber manufactured by the method according to the second embodiment is described below. A core rod made of silica glass and having a diameter of 1.00 millimeter was used. Capillary tubes made of silica glass and having inner diameters of 0.50 millimeter or in a range from 0.40 millimeter to 0.60 millimeter, and outer diameters of 1.00 millimeter or in a range from 0.90 millimeter to 1.10 millimeters were prepared. Among the capillary tubes, those having the inner diameters of which errors were within plus or minus 2% of an inner-diameter designed value and the outer diameters of which errors were within plus or minus 2% of an outer-diameter designed value were selected. Then, the selected capillary tubes were arranged on a first layer from the core rod to form a preform, and the holey fiber is drawn from the preform. At the time of drawing, gas pressure is controlled so that an average of inner diameters of holes of the capillary tubes on the first layer reach a target value.

Figure 16:
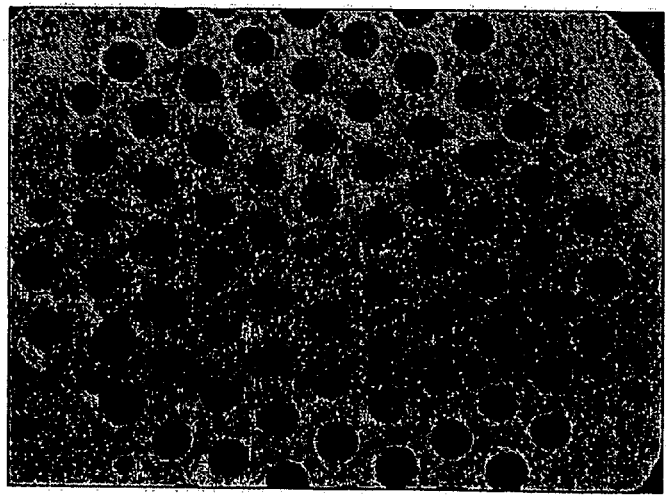
FIG. 16 is a photographed image of a cross section of the holey fiber according to the second embodiment.

FIG. 16 is a photographed image of a cross section of the holey fiber according to the second embodiment. As can be seen from FIG. 16, the holey fiber is formed so that the air holes on the first layer from the core region have the inner diameters of which error is within plus or minus 2% of the inner-diameter designed value and air hole pitches with errors within plus or minus 2% of an air-hole-pitch designed value with precision. On the other hand, air holes on layers other than the first layer have various inner diameters.

FIG. 17 is a table containing data of characteristics of the holey fiber shown in FIG. 16. The bending loss was calculated based on the photographed image of FIG. 16, and other characteristics were measured values. As shown in FIG. 17, the holey fiber has substantially the same characteristics as that of the holey fiber shown in FIG. 5.

The preform is formed by the stack and draw method. However, the preform can be formed by the drill method or the sol-gel method. For example, when employing the drill method, a preform is formed in such a manner that air holes are formed on a glass rod other than a center portion of the glass rod using a drill. Then, the holey fiber is drawn from the preform while controlling gas pressure in the same manner as that described in the embodiments.

Furthermore, upon employing the drill method, by precisely forming air holes on a first layer, it is possible to reduce operational load and processing time in a manufacturing method compared to a case of precisely forming all air holes.

According to an aspect of the present invention, operational load and processing time in a process of manufacturing the holey fiber can be reduced. Therefore, a holey fiber with desired characteristics can be manufactured easily and quickly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a holey fiber including a core region and a cladding region surrounding the core region and having air holes arranged around the core region in layers, the method comprising:

forming a preform by arranging a core rod at a center of a jacket tube and arranging capillary tubes having hollows around the core rod inside the jacket tube;

drawing the preform by heat melting the preform in a heating furnace;

determining, during the step of drawing the preform, whether an average of inner diameters of air holes in a first layer from the core region among a plurality of layers of air holes has reached a target value; and controlling, during the step of drawing the preform, at least one of a gas pressure to be applied to insides of the hollows of the capillary tubes, a temperature of the heating furnace, and a drawing speed, based only on a structure of only the air holes in the first layer from the core region among the plurality of layers of air holes and on the determination of whether the average of the inner diameters of the air holes in the first layer from the core region has reached the target value, wherein the number of layers of the air holes are three or more, diameters of the air holes are substantially uniform, and intervals between the air holes are substantially uniform.

2. The method according to claim 1, wherein the drawing includes drawing the preform while controlling gas pressure to be applied to the insides of the hollows of the capillary tubes based on a structure of air holes to be formed in the first layer from the core region.

3. A method of manufacturing a holey fiber including a core region and a cladding region surrounding the core region and having air holes arranged around the core region in layers, the method comprising:

forming a preform by arranging a core rod at a center of a jacket tube and arranging capillary tubes having hollows around the core rod inside the jacket tube; and drawing the preform by heat melting the preform in a heating furnace, wherein the drawing includes preparing capillary tubes;

measuring errors of inner diameters of the capillary tubes from an inner diameter reference value and measuring errors of outer diameters of the capillary tubes from an outer diameter reference value;

selecting a predetermined number of the capillary tubes having errors smaller than a threshold based on the errors measured at the measuring;

arranging the capillary tubes selected at the selecting in a first layer from the core rod, determining whether an average of inner diameters of air holes in the first layer from the core region among a plurality of layers of air holes has reached a target value; and controlling at least one of a gas pressure to be applied to insides of the hollows of the capillary tubes, a temperature of the heating furnace, and a drawing speed, based on a structure of only the air holes in the first layer from the core region among the plurality of layers of air holes and on the determination of whether the average of the inner diameters of the air holes in the first layer from the core region has reached the target value, wherein the number of layers of the air holes are three or more, diameters of the air holes are substantially uniform, and intervals between the air holes are substantially uniform.

4. The method according to claim 3, wherein the drawing includes drawing the preform while controlling gas pressure to be applied to the insides of the hollows of the capillary tubes based on a structure of the air holes to be formed in the first layer from the core region.

5. The method according to claim 3, wherein the threshold is an average of the measured errors.

* * * * *